United States Patent Office 3,155,589
Patented Nov. 3, 1964

3,155,589
PARENTERAL EXTRAVASCULAR INJECTABLE VACCINES FOR SIMULTANEOUS IMMUNIZATION OF CANIDAE AGAINST RABIES, CANINE DISTEMPER, AND INFECTIOUS CANINE HEPATITIS
Eben A. Slater, St. Joseph, Mo., assignor to The Upjohn Company, Kalamazoo, Mich., a corporation of Michigan
No Drawing. Filed Apr. 14, 1958, Ser. No. 728,045
11 Claims. (Cl. 167—78)

This invention relates to novel polyvalent vaccines containing live, attenuated, immunogenic viruses, to a process for preparing the same, and to a process for using the same to evoke immunity to disease in animals. More particularly, the invention is directed to these several aspects of polyvalent live virus vaccines comprising at least two viruses selected from the group consisting of live, attenuated infectious canine hepatitis virus; live, attenuated canine distemper virus; and live, attenuated rabies virus. A facile method for attenuating infectious canine hepatitis virus in tissue culture and the formulation of the above-identified live, attenuated viruses so that they are mutually stable in the presence of each other constitutes the process of the invention.

The polyvalent live, attenuated virus vaccines of this invention are unique and were heretofore unknown in the art. It is surprising to discover that the live, attenuated virus components of the vaccines of the invention can be intimately associated with each other and stored for periods of many months without mutual denaturation and inactivation. It is likewise surprising to discover that the canine distemper component produces superior neutralizing antibody response in the presence of infectious canine hepatitis virus and/or rabies virus than when administered alone.

It has been found that the live, attenuated virus components of the vaccines of the invention instigate the production of specific antibodies, and confer immunity to infection by virulent street viruses without causing disease or unfavorable post-vaccinal reactions. It has also been found that the said components of the vaccines of the invention can be administered at the same time and at the same site of injection. Thus, the invention provides divalent and trivalent vaccines which afford simultaneous vaccination of animals of the Canidae family (such as dogs and foxes) against canine distemper, infectious canine hepatitis, and rabies.

The prophylatic vaccination of dogs against distemper has been known since about 1928, when Laidlaw and Dunkin introduced the first successful vaccine against that disease. Later, a modified "distemperoid" virus was developed by consecutive serial passages of Laidlaw-Dunkin virus through ferrets (U.S. Patent 2,136,131). Subsequently, Haig [Jour. South African Vet. Med. Assoc. 19: 73–80 (1948)] was able to adapt and propagate the "distemperoid" virus in chicken embryos, and he demonstrated a further attenuation of the virus after about ninety consecutive serial passages. At about the same time Koprowski and Cox [Jour. Immunol. 60: 533–544 (1948)] developed a live, attenuated rabies virus (Flury strain) after about eighty serial passages in the chicken embryo. The safety and efficacy of these chicken-embryo attenuated viruses are too well known and documented to require repetition here.

Infectious canine hepatitis has been recognized as a serious and widespread disease of dogs in the United States since about 1951. Earlier, this disease was described by Green as fox encephalitis. His studies were confirmed by the investigations of Rubarth in 1947. Prior to this invention, the only vaccine available for protecting susceptible dogs from infectious canine hepatitis was an inactivated virus vaccine, which produced a transient immunity of only about six months' duration.

It was not heretofore known that a vaccine containing more than one live, attenuated virus of the group consisting of canine distemper virus, rabies virus, and infectious canine hepatitis virus is effective, and that these viruses are mutually stable in the presence of each other. Consequently, dog owners have had to submit their animals to veterinarians for a series of individual vaccinations before complete immunization was obtained. Thus an inherent disadvantage of the prior art arises from the possibility of exposure to virulent infection before the schedule of indvidual vaccinations is completed. Frequent "breaks" during the immunization program have been a serious concern of veterinary practitioners, and breeding kennel and pet owners alike.

These and other disadvantages of the vaccines of the prior art have now been overcome with the novel vaccines of this invention. It is now possible to administer a trivalent vaccine or a divalent vaccine of the invention to susceptible dogs and obtain simultaneous and prolonged immunity. The danger of post-vaccinal reactions is greatly reduced, "breaks" are eliminated, time-consuming visits to veterinarians are reduced, the vaccines can be manufactured, packaged, and distributed more efficiently, and it is easier to synchronize vaccination against these diseases with "receptive good heath" of the animals. For example, it is well known that puppies retain passive immunity against many viral infections during the first few months of life, and that optimal antibody response cannot be obtained if vaccination is attempted while passive immunity exists. Also, physiological stresses induced by weaning deworming, and teething influence the optimal time for vaccination. Thus the vaccines of the invention facilitate immunization because susceptible puppies vaccinated at the proper time suffer less reaction and give bettter antibody response.

A principal object of this invention is to provide polyvalent vaccines contining live, attenuated viruses which are mutually stable in the presence of each other, instigate production of antibodies, and confer immunity to infection by virulent street viruses. Another principal object of this invention is to provide a live, attenuated infectious canine hepatitis virus which retains its immunogenic qualities in the presence of live, attenuated canine distemper virus and live, attenuated rabies virus. A further object of this invention is to provide a live, attenuated infectious canine hepatitis virus grown in tissue culture, which virus is stable in the presence of live, attenuated canine distemper virus and live, attenuated rabies virus. Still another object of this invention is to provide vaccines containing live, attenuated infectious canine hepatitis virus propagated in cultures of dog kidney epithelial cells, live, attenuated canine distemper virus propagated in avian extraembryonic membranes, and live, attenuated rabies virus propagated in avian embryos, which viruses are mutually stable in the presence of each other, and which individually instigate specific antibody production when administered to susceptible dogs. Still another object of this invention is to provide a process for preparing polyvalent vaccines of the kind indicated. Still another object is to provide a process for using said polyvalent vaccines to evoke immunity to disease in animals, particularly dogs.

These and other objects of the invention have been accomplished by consecutive serial passages of virulent infectious canine hepatitis virus in tissue culture until the virus no longer produces signs of disease in dogs, and combining the live, attenuated infectious canine hepatitis virus, so produced, with live, attenuated canine distemper virus and live, attenuated rabies, virus which have been propagated in avian embryonic tissues.

The live, attenuated infectious canine hepatitis virus of this invention can be obtained by consecutive serial passage in tissue cultures, such as dog kidney epithelial cells. The cultural technique used in accordance with this method is a modification of that described by Cabasso et al. [Proc. Soc. Exptl. Biol. Med. 85: 239–245 (1954)] for the propagation of infectious canine hepatitis virus in tissue cultures. The virulent virus with which the present studies were initiated was obtained from the liver of a dog that had died from infectious canine hepatitis. A ten percent suspension of liver tissue is prepared with broth saline (beef broth diluted with an equal volume of isotonic salt solution), and 0.2 milliliter of the suspension is inoculated into roller tubes. The roller-tube cultures of dog kidney epithelial cells are prepared by trypsin digest of kidney cortical tissue according to the procedure described by Dulbecco and Vogt [Jour. Exptl. Med. 99: 167 (1954)], and as modified by Youngner [Proc. Soc. Exptl. Biol. Med. 85: 202 (1954)]. The trypsinized epithelial cells can be propagated in any complete tissue culture nutrient medium such as Hanks' balanced salt solution [Jour. Cell. Comp. Physiol. 31: 235 (1948)] with lactalbumin hydrolysate and an inactivated serum, Earle's salt solution [Jour. Nat. Cancer. Inst. 4: 165 (1943)] with lactalbumin hydrolysate an and inactivated serum, medium 199 [Morgan, Morton, and Parker, Proc. Soc. Exptl. Biol. Med. 73: 1–8 (1950)], Eagle's medium [Science 122: 501 (1955)], medium NCTC 107 [Evans et al., Cancer Research 16: 77 (1956)], and the like. Although synthetic media such as medium 199, Eagle's medium, medium NCTC 107, etc., can be used alone, it is preferred to add to such media about five to ten percent by volume of an inactivated mammalian serum such as horse serum, or a bovine serum such as calf serum. For example, a satisfactory nutrient medium consists of Hanks' balanced salt solution with 0.5 percent lactalbumin hydrolysate by weight, 0.1 percent crystalline bovine albumin by weight, and five percent inactivated horse serum by volume. Contamination of the nutrient medium can be prevented by including antibiotics such as penicillin, streptomycin, and mycostatin. The roller-tube cultures are incubated at 37 degrees centigrade for four to five days and then inoculated with 0.2 milliliter of the original infected liver suspension. After further incubation at 37 degrees centigrade for six days, the virus-infected nutrient medium is recovered, freed from cellular debris by centrifugation, and inoculated in 0.2-milliliter amounts into fresh cultures of epithelial cells. After about sixty passages, according to this procedure, the infectious canine hepatitis virus is no longer virulent, and when inoculated into susceptible dogs, causes no signs of disease.

An alternative procedure (preferred) for attenuating the virulent infectious canine hepatitis virus has been provided by employing the terminal dilution technique of Sabin [Jour. Exptl. Med. 99: 551 (1954)]. According to this procedure, 0.2 milliliter of the original infected liver suspension is inoculated into each dog kidney epithelial cell culture. After growth and multiplication of the virus is established, as evidenced by degeneration of the cells, the terminal dilution technique is employed wherein the virus-infected nutrient medium from each passage is diluted to the end point ($10^{-5}$) and re-inoculated into fresh cultures at intervals of about 24 hours. For example, after 26 such serial passages, the virus was no longer virulent, as shown by inoculation in susceptible dogs. It is to be understood, however, that attenuation can be accomplished by from about twenty to thirty such serial passages. Illustratively, upon continued passage in roller-tube cultures the titer of the virus was increased from $10^{-6}$ at the 26th passage to $10^{-9}$ at the 84th passage, with a corresponding increase in immunogenicity. A suitable live, attenuated infectious canine hepatitis virus component of the vaccines of this invention is obtained from the nutrient medium, with or without partial or complete removal of cellular debris.

It should be understood that many modifications of the foregoing attenuation procedures can be utilized successfully. For example, other dog tissues can be employed, such as uterine tissue, testicular tissue, or spleen cells. It is also possible to propagate the virus in cultures of pig kidney epithelial cells. The incubating cultures of the various tissues are advantageously maintained between temperatures of about 25 to forty degrees centigrade, temperatures between about 32 to 38 degrees centigrade being preferred.

It is not necessary that the tissue cultures be prepared according to the trypsinized tissue technique described above; e.g., the plasma-clot method of Enders, or a Maitland-type suspension culture technique can be used. Satisfactory cultures of epithelial cells can be obtained from the kidneys of pups three to six months of age. Cultures from kidneys of younger pups appear to become established more readily, but such cultures contain a high proportion of fibroblast cells, which are not infected by the virus and tend to overgrow the epithelial cells.

Any of the recently developed modified canine distemper viruses such as the Haig strain or Wisconsin FxNO strain are suitable as the live, attenuated distemper component of the vaccines of this invention. Large quantities of such viruses can be prepared from the chorioallantoic membranes of fourteen- to sixteen-day chicken embryos, which have been inoculated on the seventh day with the egg-adapted virus. The techniques of inoculating and harvesting canine distemper virus from incubating eggs are well known in the art. The chorioallantoic membranes of infected embroys are removed from the egg and ground into a suspension with a parenterally acceptable aqueous vehicle, such as broth, broth saline solution, isotonic saline solution, water, etc. If desired, the suspension of virus can be freed partially or completely from cellular debris by any suitable method. Distemper virus modified by ferret passage, such as distemperoid virus, is also suitable as the live, attenuated distemper component of the vaccines of this invention.

The live, attenuated rabies virus suitable as the rabies component of the vaccines of the invention is prepared by inoculating seven-day chicken embroys with an egg-adapted strain of rabies virus, such as the Flury strain described by Koprowski and Cox [Jour. Immunol. 60: 533–554 (1948)], harvesting the embroys at about the 15th to 17th day of incubation, grinding the embryos into a suspension with a parenterally acceptable aqueous vehicle, such as broth, broth saline solution, isotonic saline solution, water, etc., and if desired, partially or completely freeing the suspension of cellular debris.

Chicken eggs are preferred for producing large quantities of avian embryo-adapted viruses, because they are available throughout the year and at low cost. Nevertheless, the eggs of other fowl such as ducks, turkeys, geese, and the like can be used, it being understood, of course, that the amount of inoculum can be varied according to the size of the egg, and that the time of inoculation should correspond to the total length of the various incubation periods.

The novel polyvalent vaccines of the invention are prepared by formulating the individual virus suspensions. The individual components can be mixed in various proportions, making certain, of course, such as by routine assay, that there is sufficient immunogenic mass of each component to instigate production of antibody. For example, an excellent trivalent vaccine can be prepared by formulating together one part by volume canine distemper component, 1.5 parts by volume rabies component, and one part by volume of infectious canine hepatitis component. If a divalent vaccine is desired, one part by volume of distemper component can, for example, be formulated with one part by volume of infectious canine hepatitis component. If desired, the proportion of the latter component can be reduced, such as to as little as about 0.25 part, or even less. It will be understood, however, that the optimum proportions of the individual components will depend upon the individual titers of these components as they are harvested from their propagation media. This is to say that virus suspensions of high titer can be used in lower proportions than corresponding virus suspension of low titer.

The novel vaccines of this invention have been administered to dogs by parenteral extravascular injection, both intramuscularly and subcuatenously. It is known that the rabies component of the vaccines of the invention should be administered intramuscularly in order to obtain maximum antibody response. However, it has been the usual practice to administer canine distemper vaccines subcutaneously. Extensive trials have shown that the polyvalent vaccines of the invention containing a rabies component can be administered intramuscularly and effective immunization against canine distemper and infectious canine hepatitis is obtained. When a divalent vaccine consisting of live, attenuated canine distemper virus and live, attenuated infectious canine hepatitis virus is administered, it can be injected subcutaneously of intramuscularly as desired. In one test involving a trivalent vaccine of this invention, a two-milliliter dose was administered intramuscularly to each of 200 beagles and 330 mongrel dogs. No post-vaccinal reactions were noted.

The following examples are illustrative of the process and products of the present invention, but are not to be construed as limiting.

EXAMPLE 1.—PROPAGATION OF CANINE DISTEMPER VIRUS

Fertile hens' eggs were incubated for seven days at 99¾ degrees Fahrenheit. The eggs were candled and all dead and weak embryos were discarded. Then 0.2 milliliter of a suspension of egg-adapted canine distemper virus (Wisconsin FxNO strain) was inoculated on the dropped chorioallantoic membrane of each egg, and the shell was sealed. The inoculated eggs were incubated at the same temperature for seven days, at which time any dead embryos were removed by candling. The shells of the eggs containing live infected embryos were wiped with alcohol in order to disinfect the surface. The embryos and their enveloping membranes were exposed and the chorioallantoic membranes were harvested, pooled, and ground in a Tenbroeck grinder with sufficient broth saline solution to give a fifty percent suspension. The suspension was centrifuged for ten minutes at 1000 revolutions per minute, and the supernatant containing the distemper virus was retained.

Each 0.1 milliliter of this suspension contained $10^{4.5}$ median infective dosages when inoculated on the dropped chorioallantoic membrane of seven-day chicken embryos.

EXAMPLE 2.—PROPAGATION OF RABIES VIRUS

Fertile hens' eggs were incubated for seven days at 99¾ degrees Fahrenheit. The eggs were candled and all dead and weak embryos were discarded. The shell over the air sac was wiped with alcohol and a small hole was made. A one-milliliter tuberculin syringe fitted with a 1½ inch 27-gauge needle was used to introduce 0.25 milliliter of egg-adapted rabies virus (Flury strain) into the yolk sac of each egg, and the hole was sealed. Incubation of the inoculated eggs was continued at the same temperature for nine days. The eggs containing live embryos were then wiped with alcohol, opened, and the embryos were removed. The pooled embryos were weighed and ground in a blender with sufficient sterile water to make a 66 percent suspension (weight:volume). This suspension was then centrifuged for ten minutes at 1000 revolutions per minute. The supernatant assayed $10^{3.5}$ median infective dosages, as determined by intracerebral inoculation, using 0.03 milliliter amounts in five-day-old white Swiss mice.

EXAMPLE 3.—PROPAGATION OF INFECTIOUS CANINE HEPATITIS VIRUS

A six-months old pup was humanely sacrificed and the kidneys were removed. The capsule was stripped and the hiler structures were excised leaving the cortical renal tissue. The tissue was minced with scissors and washed three times with saline to remove substantially all blood. The fragments of kidney tissue were then mixed with fifty milliliters of a 0.025 percent trypsin solution and incubated for six hours at six degrees centigrade. The digest was allowed to settle and the supernatant which contained cells and cell clumps was saved. The sedimented fragments were resuspended in fifty milliliters of the trypsin solution, and digestion was continued for sixteen hours at six degrees centigrade. After centrifugation, the supernatant was decanted and was combined with the supernatant from the first digestion. The combined trypsin digest was centrifuged for thirty minutes at 500 revolutions per minute and the trypsin solution was decanted. The sedimented cells were suspended in 200 volumes of a nutrient medium consisting of 85 percent Hanks' balanced salt solution, 5 percent casein hydrolysate, and ten percent inactivated horse serum (inactivated by heating at 56 degrees centigrade for thirty minutes); all proportions are by volume. Sixty-milliliter portions were charged into Roux bottles and incubated at 37.5 degrees centigrade for five days. The original nutrient medium was discarded and replaced by fresh medium containing $10^2$ $TCID_{50}$ of attenuated (26th passage) infectious canine hepatitis virus per milliliter. Incubation of the inoculated tissue culture was continued for five days, at which time the medium was harvested. The medium contained $10^6$ $TCID_{50}$ when titered in 0.2-milliliter amounts in roller-tube cultures of dog kidney epithelial cells.

The virus-containing medium was centrifuged at 1000 revolutions per minute for ten minutes in order to remove cellular debris.

EXAMPLE 4.—PREPARATION OF TRIVALENT VACCINE

Two hundred and fifty grams (wet weight) of distemper-virus-infected chorioallantoic membrane material produced according to the procedure of Example 1 was chilled to two degrees centigrade and homogenized with 250 milliliters of fifty percent (by volume) broth saline, also at two degrees centigrade. The resultant brei is termed a fifty percent suspension of distemper virus.

A second brei was prepared by homogenizing 335 grams of rabies-virus-infected chicken embryos (wet weight), produced according to the procedure of Example 2, with 165 milliliters of fifty percent (by volume) broth saline, containing 500 units of penicillin and 500 micrograms of streptomycin per milliliter, for one minute at two degrees centigrade. This brei is termed a 67 percent suspension of rabies virus.

The foregoing brei were mixed, together with 500 milliliters of the infectious canine hepatitis virus suspension produced according to the procedure of Example 3, and the mixture was homogenized for five minutes with an immersion type mixer while sterile nitrogen was bubbled through the mixture. The homogenate was filtered through a single layer of sterile cheesecloth. Three-milliliter portions of the vaccine were filled into six-milliliter serum bottles, which were then sealed under sterile conditions and stored at minus 72 degrees centigrade.

EXAMPLE 5.—PREPARATION OF TRIVALENT VACCINE

One hundred milliliters of canine distemper virus suspension prepared as in Example 1 was mixed with 150 milliliters of rabies virus suspension prepared as in Example 2, and 100 milliliters of tissue culture medium containing infectious canine hepatitis virus prepared as in Example 3. The mixing was carried out at two degrees centigrade by gentle agitation with an immersion type stirrer in order to avoid aeration, while sterile nitrogen was bubbled through the mixture. After mixing for fifteen minutes, the vaccine was distributed in 3.5-milliliter amounts into glass ampoules which were sealed and stored at minus 72 degrees centigrade.

EXAMPLE 6.—PREPARATION OF DIVALENT VACCINE

One hundred milliliters of canine distemper virus suspension prepared according to the procedure of Example 1 was chilled to two degrees centigrade and mixed with 100 milliliters of a suspension of infectious canine hepatitis virus prepared according to the procedure of Example 3. During mixing, which continued for fifteen minutes, the suspension was maintained at two degrees centigrade and gentle agitation was provided by an immersion type stirrer, while sterile nitrogen was bubbled through the suspension. The thoroughly mixed vaccine suspension was distributed in two-milliliter amounts into five-milliliter serum bottles, lyophilized at minus 72 degrees centigrade, sealed, and stored at six degrees centigrade.

EXAMPLE 7.—TEST OF TRIVALENT VACCINE

Each of thirteen sibling beagle pups, four months of age, was vaccinated by intramuscular injection of 3.5 milliliters of the trivalent vaccine of Example 5. The pups were observed for signs of reaction for eleven days, but all appeared normally responsive and attentive.

On the twelfth post-vaccination day each pup was challenged subcutaneously with a 0.5 milliliter inoculum of a suspension of virulent infectious canine hepatitis virus prepared by homogenizing, in an equal weight of broth saline, the liver from a dog dead from infectious canine hepatitis. On the same day, a second challenge inoculum (one milliliter) of a suspension of virulent canine distemper virus was also administered subcutaneously. This suspension was prepared by homogenizing the spleen of a dog dead from distemper with an equal weight of broth saline. The hepatitis inoculum contained about 500,000 infectious dosages of virulent virus when assayed in dogs. The distemper inoculum contained about 1,000,000 infectious dosages when assayed in dogs. Table I shows daily temperature reactions after the challenge inoculations.

Pup #738 died from infectious canine hepatitis as established by the presence of typical intranuclear inclusion bodies in the liver. Post-mortem examination of pup #735 was inconclusive. Nevertheless, the survival in good health of eleven out of thirteen pups cogently illustrates the safety and efficacy of the vaccines of the invention.

Quite surprisingly, it was found that the canine distemper neutralization titers of sera obtained by bleeding pups receiving trivalent vaccine were about twice those of pups vaccinated with the live, attenuated canine distemper component alone. Representative neutralization titers are shown in Table II.

*Table II*

COMPARISON OF SERUM NEUTRALIZATION TITERS

| Pups vaccinated with canine distemper vaccine | | Pups vaccinated with trivalent vaccine | |
|---|---|---|---|
| Pup | Final neutralizing serum silution | Pup | Final neutralizing serum dilution |
| #710 | 1:16 | #743 | 1:64 |
| #711 | 1:32 | #750 | 1:128 |
| #713 | 1:64 | #744 | 1:64 |
| #717 | 1:32 | #734 | 1:32 |
| #718 | 1:32 | #740 | 1:64 |
| #720 | 1:128 | #742 | 1:256 |

EXAMPLE 8.—STABILITY OF TRIVALENT VACCINE

Three hundred and thirty-five grams (wet weight) of chicken embryos infected with rabies virus according to the procedure of Example 2 where homogenized with 165 milliliters of broth saline at six degrees centigrade.

Two hundred and fifty grams (wet weight) of chorioallantoic membranes infected with canine distemper according to the procedure of Example 1 were homogenized with 250 milliliters of broth saline at six degrees centigrade.

After combining the foregoing brei, 500 milliliters of a 1:10 (by volume) dilution with broth saline of supernatant from dog kidney epithelial cell cultures of infectious canine hepatitis harvested after complete cytopathic destruction of the culture (titer=$10^{-9}$ $TCID_{50}$) was added, and the mixing and homogenization were continued for five minutes with an immersion-type stirrer. Sterile nitrogen was bubbled through the brei during agi-

*Table I*

VACCINATION WITH TRIVALENT VACCINE AND CHALLENGE WITH VIRULENT VIRUS

| Post-vaccination day | Temperatures and reactions in pups challenged with virulent distemper and I.C.H. viruses | | | | | | | | | | | | |
|---|---|---|---|---|---|---|---|---|---|---|---|---|---|
| | #746 | #747 | #749 | #745 | #733 | #737 | #734 | #750 | #735 | #742 | #740 | #744 | #743 |
| 13 | 102.0 | 103.0 | 103.2 | 103.0 | 103.0 | 102.6 | 102.5 | 103.0 | 101.8 | 102.2 | 102.2 | 102.0 | 103.0 |
| 14 | 103.8 | 103.8 | 104.3 | 104.6 | 104.7 | 102.4 | 104.3 | 104.0 | 104.7 | 104.0 | 104.0 | 104.0 | 105.3 |
| 15 | 103.7 | 103.7 | 104.7 | 105.2 | 105.4 | 104.7 | 103.8 | 104.0 | 103.8 | 103.0 | 104.8 | 105.1 | |
| 16 | 102.0 | 104.0 | 103.0 | 103.5 | 104.0 | 103.9 | 104.3 | 104.0 | Dead | 104.2 | 104.3 | 105.2 | 104.5 |
| 17 | 100.8 | 103.6 | 103.1 | 104.2 | 103.5 | 103.3 | 103.5 |  | 103.8 | 104.4 | 104.5 | 104.7 | |
| 18 | 100.5 | 101.3 | 101.9 | 104.2 | 103.9 | 102.8 | 102.9 | 102.7 |  | 102.9 | 104.8 | 103.8 | 104.0 |
| 19 | 102.3 | 103.2 | 102.5 | 102.8 | 105.0 | 102.7 | 102.0 | 102.6 |  | 102.0 | 101.7 | 103.2 | 101.5 |
| 20 | 102.6 | 102.8 | 102.2 | 102.4 | Dead | 102.0 | 101.7 | 101.0 |  | 102.6 | 101.6 | 102.2 | 100.6 |
| 21 | 102.6 | 103.5 | 102.6 | 101.6 |  | 102.4 | 102.3 | 101.8 |  | 102.2 | 102.2 | 101.7 | 101.4 |
| 22 | 102.5 | 102.8 | 102.3 | 102.0 |  | 102.1 | 102.4 | 102.0 |  | 102.2 | 101.4 | 101.3 | 101.2 |
| 23 | 102.4 | 103.6 | 103.0 | 101.7 |  | 102.6 | 102.0 | 102.6 |  | 102.6 | 101.6 | 102.3 | 101.5 |
| 24 | 102.7 | 103.3 | 103.1 | 102.5 |  | 102.0 | 101.9 | 101.8 |  | 102.3 | 101.8 | 102.0 | 101.9 |
| 25 | 102.8 | 103.3 | 102.6 | 102.4 |  | 102.2 | 102.0 | 102.3 |  | 101.8 | 101.6 | 102.3 | 102.3 |
| 26 | 102.5 | 102.6 | 103.5 | 102.5 |  | 103.0 | 102.3 | 102.6 |  | 103.0 | 102.4 | 102.5 | 101.5 |
| 27 | 102.1 | 103.6 | 102.5 | 102.6 |  | 102.2 | 102.2 | 102.6 |  | 102.6 | 101.6 | 102.2 | 101.5 |
| 28 | 102.0 | 103.0 | 102.0 | 101.4 |  | 102.0 | 102.0 | 101.7 |  | 102.3 | 101.8 | 102.5 | 101.6 |
| 30 | 102.2 | 102.7 | 101.7 | 102.2 |  | 101.5 | 102.6 | 102.6 |  | 103.0 | 101.1 | 101.8 | 102.2 |

It will be appreciated that the challenge procedure was extremely drastic, since the inocula contained massive concentrations of virulent virus and the challenge was imposed only twelve days after vaccination. Therefore, it was not surprising to find that all of the pups gave a transient febrile response, and that two of the thirteen died.

tation, care being taken to minimize the incorporation of air. After homogenization the brei was filtered through sterile cheesecloth and sufficient penicillin and streptomycin were added to give a concentration of 500 units and 500 micrograms per milliliter, respectively. About 500 three-milliliter doese of this trivalent vaccine were filled into six-milliliter serum bottles, quick-frozen at minus 72 degrees centigrade, and lyophilized at a condenser temperature of minus 72 degrees centigrade to an average moisture content of 2.17 percent, sealed, and stored at six degrees centigrade.

Assay of the viability of each virus component was conducted at about monthly intervals. The rabies component was assayed by intracranial inoculation into one- to two-day old suckling mice. The distemper component was assayed by lesion counts on the chorioallantoic membranes of chicken embryos inoculated on the seventh day. Viability of the infectious canine hepatitis component was determined by the development of typical cytopathic changes of dog kidney epithelial cells in roller-tube cultures. The rabies and infectious canine hepatitis viruses remained viable for at least ten months. The canine distemper virus remained viable for at least six months; its stability on storage in combination with the other viruses is the same as singly.

EXAMPLE 9.—RAPID ATTENUATION OF INFECTIOUS CANINE HEPATITIS VIRUS

A roller-tube culture of dog kidney epithelial cells was inoculated with 0.2 milliliter of a ten percent suspension in broth saline of the liver from a dog that had died of infectious canine hepatitis. The cell culture was incubated at 37 degrees centigrade for six days, at which time the cells exhibited marked cytopathic changes. The virus-infected nutrient medium was harvested and serially diluted by ten-fold steps with broth saline to a final concentration of $10^{-5}$. A 0.2-milliliter amount of the $10^{-5}$ dilution was then inoculated into a fresh roller-tube culture of dog kidney epithelial cells. The inoculated culture was incubated at 37 degrees centigrade for 24 hours and the virus-infected nutrient medium was harvested. The suspension was serially diluted to $10^{-5}$ concentration and 0.2 milliliter was inoculated into a fresh roller-tube culture of dog kidney epithelial cells. After 26 such daily passages, one-milliliter amounts of the virus-infected nutrient medium was injected into each of four susceptible dogs. The dogs showed no signs of infection or post-vaccinal reactions and were found to be immune upon challenge with virulent infectious canine hepatitis virus.

It is to be understood that the invention is not to be limited to the exact details of operation or exact preparations shown and described, as obvious modifications and equivalents will be apparent to one skilled in the art, and the invention is therefore to be limited only by the scope of the appended claims.

I claim:

1. Vaccine composition comprising at least two live, attenuated, and immunogenic viruses selected from the group consisting of canine distemper virus propagated in avian embryonic tissues, rabies virus propagated in avian embryonic tissues, and infectious canine hepatitis virus propagated in in vitro tissue culture selected from the group consisting of dog kidney epithelial, dog uterine, dog testicular, dog spleen, and pig kidney epithelial cell cultures, said infectious canine hepatitis virus having a titer of at least $10^{-6}$ TCID$_{50}$ and being substantially avirulent to dogs, which viruses are mutually stable in the presence of each other and components of the tissues in which the viruses are propagated, and capable of instigating the production of specific antibodies in animals of the Canidae family when administered by parenteral extravascular injection.

2. Vaccine composition comprising live, attenuated canine distemper virus propagated in avian embryonic tissues and live, attenuated infectious canine hepatitis virus propagated in in vitro tissue culture selected from the group consisting of dog kidney epithelial, dog uterine, dog testicular, dog spleen, and pig kidney epithelial cell cultures, said infectious canine hepatitis virus having a titer of at least $10^{-6}$ TCID$_{50}$ and being substantially avirulent to dogs, which viruses are mutually stable in the presence of each other and components of the tissues in which they were propagated, and capable of instigating the production of specific antibodies in animals of the Canidae family when administered by parenteral extravascular injection.

3. Vaccine composition comprising live, attenuated canine distemper virus propagated in avian embryonic tissue, live, attenuated rabies virus propagated in avian embryonic tissue, and live, attenuated infectious canine hepatitis virus propagated in in vitro tissue culture selected from the group consisting of dog kidney epithelial, dog uterine, dog testicular, dog spleen, and pig kidney epithelial cell cultures, said infectious canine hepatitis virus having a titer of at least $10^{-6}$ TCID$_{50}$ and being substantially avirulent to dogs, which viruses are mutually stable in the presence of each other and components of the tissues in which they are propagated, and capable of instigating the production of specific antibodies in animals of the Canidae family when administered by parenteral extravascular injection.

4. Vaccine composition comprising live, attenuated canine distemper virus propagated on the chorioallantoic membrane of avian embryos; live, attenuated rabies virus propagated in avian embryos; and live, attenuated infectious canine hepatitis virus propagated in in vitro culture of dog kidney epithelial cells, said infectious canine hepatitis virus having a titer of at least $10^{-6}$ TCID$_{50}$ by the 26th serial passage and being substantially avirulent to dogs; which viruses are mutually stable in the presence of each other and components of homogenized said chorioallantoic membrane, homogenized said avian embryos, and said cell culture, and which are capable of instigating the production of specific antibodies in animals of the Canidae family when administered by parenteral extravascular injection.

5. The method for simultaneously evoking immunity in susceptible Canidae against at least two of the diseases rabies, canine distemper, and infectious canine hepatitis which comprises administering, by parenteral extravascular injection, to said Canidae a vaccine composition containing at least two live, attenuated, and immunogenic viruses selected from the group consisting of live, attenuated infectious canine hepatitis virus propagated in in vitro tissue culture selected from the group consisting of dog kidney epithelial, dog uterine, dog testicular, dog spleen, and pig kidney epithelial cell cultures and having a titer of at least $10^{-6}$ TCID$_{50}$; live, attenuated canine distemper virus propagated in avian embryonic tissue; and live, attenuated rabies virus propagated in avian embryonic tissues.

6. The method for simultaneously evoking immunity in susceptible Canidae against the diseases canine distemper and infectious canine hepatitis which comprises administering, by parenteral extravascular injection, to said Canidae a vaccine composition containing live, attenuated infectious canine hepatitis virus propagated in renal epithelial cell cultures selected from the group consisting of dog renal epithelial cell cultures and pig renal epithelial cell cultures and having a titer of at least $10^{-6}$ TCID$_{50}$, and live, attenuated canine distemper virus propagated in avian embryonic tissue.

7. Vaccine composition comprising live, attenuated canine distemper virus and live, attenuated rabies virus propagated in avian embryonic tissues, which viruses are mutually stable in the presence of each other and capable of instigating production of specific antibodies in animals of the Canidae family when administered by parenteral extravascular injection.

8. The process which comprises inoculating a culture of dog kidney epithelial cells with virulent infectious canine hepatitis virus, incubating said culture until growth and multiplication of the virus is established and then harvesting the culture medium, and successively passing the virus in from twenty to thirty consecutive cultures of dog kidney epithelial cells at intervals of about 24 hours, thereby attenuating said virus until it is substantially avirulent to dogs and titers at least $10^{-6}$ TCID$_{50}$; and admixing the thus-produced live, attenuated infectious canine hepatitis virus with at least one other live, attenuated virus selected from the group consisting of canine distemper virus propagated in avian embryonic tissue and rabies virus propagated in avian embryonic tissues.

9. The process which comprises inoculating a culture of dog kidney epithelial cells with virulent infectious canine hepatitis virus, incubating said culture until growth and multiplication of the virus is established and then harvesting the culture medium, and successively passing the virus in from twenty to thirty consecutive culture of dog kidney epithelial cells at intervals of about 24 hours, thereby attenuating said virus until it is substantially avirulent to dogs and titers at least $10^{-6}$ TCID$_{50}$; and admixing the thus-produced live, attenuated infectious canine hepatitis virus with live, attenuated canine distemper virus propagated in avian embryonic tissue and live, attenuated rabies virus propagated in avian embryonic tissue.

10. The process which comprises inoculating a culture of dog kidney epithelial cells with virulent infectious canine hepatitis virus, incubating said culture until growth and multiplication of the virus is established and then harvesting the culture medium, and successively passing the virus in from twenty to thirty consecutive cultures of dog kidney epithelial cells at intervals of about 24 hours, thereby attenuating said virus until it is substantially avirulent to dogs and titers at least $10^{-6}$ TCID$_{50}$; and admixing the thus-produced live, attenuated infectious canine hepatitis virus with live, attenuated canine distemper virus propagated in avian embryonic tissue.

11. A process for preparing polyvalent live virus vaccine to be administered by parenteral, extravascular injection which comprises propagating live, attenuated infectious canine hepatitis virus in in vitro tissue culture selected from the group consisting of dog kidney epithelial, dog uterine, dog testicular, dog spleen, and pig kidney epithelial cell cultures, said live, attenuated infectious canine hepatitis virus having a titer of at least $10^{-6}$ TCID$_{50}$ and being substantially avirulent to dogs, harvesting said virus suspended in the tissue culture medium, blending said suspension of virus with an avian embryonic tissue homogenate infected with live, attenuated rabies virus propagated in avian embryos, and reducing the blended suspensions to a redispersible solid by lyophilization.

References Cited in the file of this patent

UNITED STATES PATENTS 2,768,114 Koprowski _____ Oct. 23, 1956
3,000,788 Emery _____ Sept. 19, 1961

OTHER REFERENCES

Stein: Keeping Livestock Healthy, Yearbook of Agriculture, 1942, U.S. Dept. of Agriculture, D.C., pp.1124–1127.

Cabasso: Proc. Soc. Expt'l. Biol. and Med., June 1949, pp. 246–248.

Robinson, J. I.: Studies of the Experimental Infection of Dogs With the Viruses of Infectious Canine Hepatitis and Canine Distemper, Thesis, Cornell Univ., February 1952, 43 pp.

Proceed. Amer. Vet. Med. Asso., June 1952, pp. 224 to 227, 230 to 232.

Gillespie: Proc. Soc. Expt'l. Biol. and Med., vol. 81, November 1952, pp. 461–463.

Poppensick: Proc. Amer. Vet. Med, Asso., vol. 89, June 1952, pp. 228–229.

Fieldsteel: Some Aspects of Infectious Canine Hepatitis Virus in Tissue Culture, Am. J. Vet. Res., vol. 17, pp. 380–388, July 1956.

Cabasso: Proc. Soc. Expt'l. Biol. and Med., vol. 85, February 1954, pp. 239–245.

Kilham et al.: Isolation of an Agent Causing Bilirubinemia and Jaundice in Raccoons (20 852), Proc. Soc. Exp. Biol. and Med. 85(2), February 1954, pp. 272–275.

Fieldsteel et al.: Cultivation and Modification of Infectious Canine Hepatitis Virus in Roller Tube Cultures of Dog Kidney, Proc. Soc. Exp. Biol. and Med., vol. 86, No. 4, pp. 819–823, August-September 1954.

Sabin: J. Expt'l. Med., vol. 99, 1954, pp. 551–576.

Helmboldt et al.: Distemper Complex in Wild Carnivores Simulating Rabies, Amer. J. Vet. Res. 16 (60), July 1955, pp. 463–469.

Kilham et al.: Jaundice and Bilirubinemia as Manifestations of Canine Distemper in Raccoons and Ferrets, Amer. J. Vet. Res. 17, January 1956, pp. 144–148.

Mansi: Dual Vaccination of Dogs Against the Canine Distemper Complex and Canine Virus Hepatitis, J. Comp. Path. and Therap., vol. 66, No. 2, pp. 136–144; April 1956.

Veterinary Drug Encyclopedia and Therapeutic Index, 4th Edition, June 6, 1956, pp. iii, iv, 3, 12, 13, 14, 41, 42, 76, 104, 110 and 194.

Kilham: Serological Studies of Canine Distemper-Complement Fixation With Spleen Antigens, Am. J. Vet. Res. 17 (64), July 1956; pp. 398–401.

Yearbook of Agriculture 1956, Animal Diseases, U.S. Dept. of Agriculture, D.C., pp. 525, 526.

Amer. J. Public Health 47; Part I, April 1957, pp. 473–483.

Veterinary Drug Encyclopedia and Therapeutic Index, 5th Edition, May 14, 1957, pp. iii, iv, 4, 7, 8, 9, 17, 18, 19, 20, 58, 59, 60, 140, 148, 260, 327, and 328.

Manuf. Chem. 28:8, August 1957, p. 363.

Sarkar, S.: Immunization of Dogs With Infectious Canine Hepatitis Virus Propagated by Tissue Culture in Swine Kidney Cells, Thesis, Cornell University, 19 pp. September 1957.

Kantorovich: Problems of Virology, 2:3–4, 1957, pp. 216–218.

Habermann et al.: Distemper in Raccoons and Foxes Suspected of Having Rabies, J. Am. Vet. M. Assn. 132(1), pp. 31–5; January 15, 1958.

Burgher et al.: Evaluation of a Combined Vaccine Consisting of Modified Canine Distemper Virus and Modified Infectious Canine Hepatitis Virus for Simultaneous Immunization of Dogs, Cornell Veterinarian, vol. 48, No. 2, pp. 214–223, April 1958.

Veterinary Drug Encyclopedia and Therapeutic Index, 6th Edition, July 10, 1958, pp. i, ii, 12, 13, 48, 49, 50, 122, 123, 218, 219, 257, 273 and 274.

Cabasso et al.: A Bivalent Live Virus Vaccine Against Canine Distemper and Infectious Canine Hepatitis, Proc. Soc. Exp. Biol. and Med., vol. 99, No. 1, pp. 46–51, October 1958.

"3-in-1 Vaccine That Includes Rabies Urged," Ohio Vet. Columbus, Ohio, vol. 7, No. 10, page 3, October 1959.

"Combined Vaccine Includes Rabies Vaccine" in JAVMA 136(1), January 1960, page 28.